Figure 1:
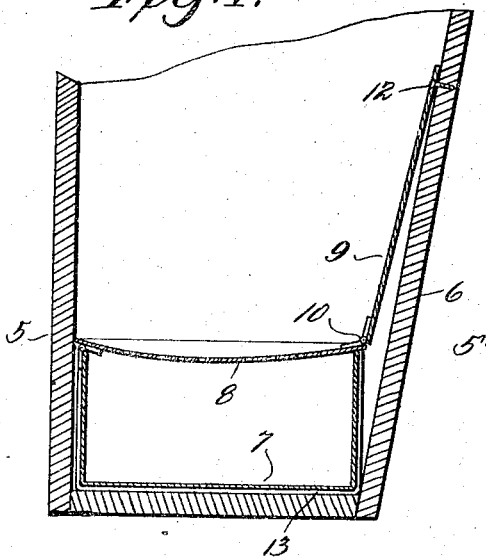

G. A. LIPSIUS.
SEED CATCHER.
APPLICATION FILED MAR. 28, 1916.

1,191,442.

Patented July 18, 1916.

Witnesses

Inventor
G. A. Lipsius
By
Attorney

UNITED STATES PATENT OFFICE.

GEORGE A. LIPSIUS, OF MARENGO, IOWA.

SEED-CATCHER.

1,191,442.  Specification of Letters Patent.  Patented July 18, 1916.

Application filed March 28, 1916. Serial No. 87,314.

*To all whom it may concern:*

Be it known that I, GEORGE A. LIPSIUS, a citizen of the United States, residing at Marengo, in the county of Iowa, State of Iowa, have invented certain new and useful Improvements in Seed-Catchers; and I do hereby declare the following to be a full, clear, and exact description of the invention, such as will enable others skilled in the art to which it appertains to make and use the same.

This invention relates to seed catchers, and has for its primary object to provide simple and efficient means for application to a manger or other animal feed trough for catching or collecting seed present in hay placed within the manger or food receptacle and which is generally lost.

A further object of the invention is to provide a device for this purpose which is of such construction as to enable the same to be applicable to mangers of various constructions or sizes and which will prove thoroughly efficient in the attainment of the ends for which it is designed.

With these objects in view, together with others which will appear as the description proceeds, the invention resides in the novel combination and arrangement of parts, all as will be described more fully hereinafter, illustrated in the drawings and particularly pointed out in the claims.

Figure 2:
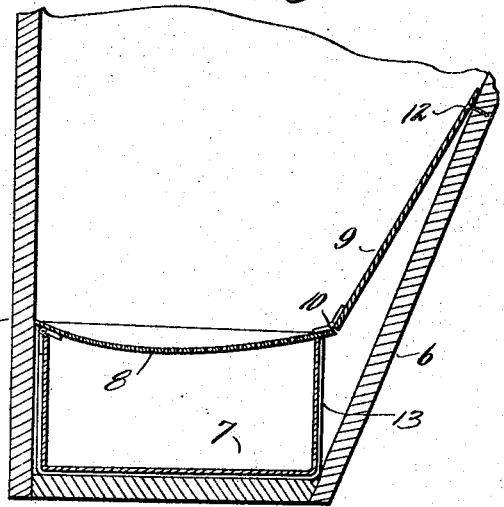
Figure 3:
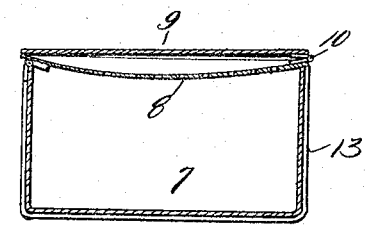
Figure 4:
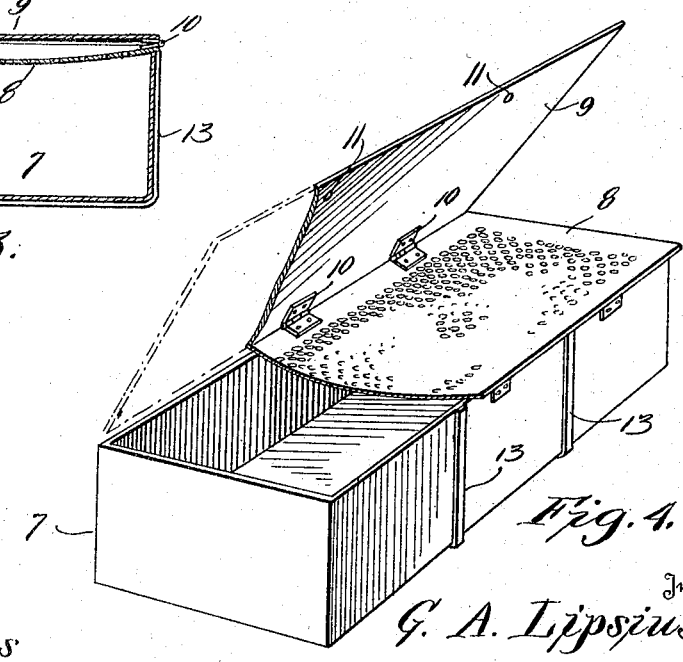

The invention will be best understood by reference to the accompanying drawings, wherein:

Figure 1, is a transverse sectional view taken through a conventional form of manger, and illustrating the application of a seed catcher embodying the invention, Fig. 2, is a similar view illustrating the catcher applied to a manger of relatively wide construction, Fig. 3, is a transverse sectional view through the improved seed catcher and illustrating the same in closed position, and Fig. 4, is a detail perspective view of the catcher removed from the manger.

Referring now more particularly to the drawings 5 indicates the rear wall of a manger, and 6 the forward or inclined wall thereof. The seed catcher in its preferred embodiment comprises a comparatively shallow rectangular boxlike structure 7, the same being formed of thin sheet metal or any other suitable material. Hinged to one of the longitudinal edges at the upper open end of the box is a foraminous cover 8. This cover is of such size and shape as to completely cover the open end of the box, being dished or concaved laterally as shown and being arranged to rest at its free edge upon the opposite edge of the box side to which the same is hinged. This cover may be of thin sheet metal provided throughout its surface with fine perforations, or may be formed of a frame having relatively narrow mesh wire stretched between its ends and sides. A lid or top 9 is hinged as at 10 at one longitudinal edge to the free edge of the cover 8, the said lid being adapted to swing back upon the foraminous cover 8 to close the open end of the box 7. The lid 9 is also capable of being swung outwardly of the box to rest at its free edge against the inner surface of the inclined wall 6 of the manger. Openings 11 are provided near the outer edge of the lid 9 through which retaining screws or bolts 12 may be inserted to detachably secure the lid 9 to the wall 6 of the manger. Strap metal braces 13 may be bound around the body portion of the box 7 to secure the various walls thereof in proper assembled position.

From this construction it is apparent that the seed catcher when inserted in the manger and arranged as shown in Fig. 1 will catch all seed which drops from the hay within the manger. The lid 9 directs the seed falling thereagainst onto the foraminous cover 8, whereupon the same passes through the cover and into the receptacle 7. With reference to Fig. 2 of the drawing it is seen that the hinged cover and lid construction enables the seed catcher to be applied to mangers of varying widths. The hay placed within the manger rests upon the foraminous cover 8 and the lid 9, and the seed contained within the hay as it is dislodged from the latter will be screened through the cover 8 and deposited in the receptacle. When desired, the screws 12 may be removed, the lid 9 folded upon the cover 8, as is shown in Fig. 3, and the catcher removed from the manger to be emptied of the seed contained therein.

What is claimed is:

1. In combination with a manger, a receptacle adapted to be inserted within the manger at the lower end thereof, a foraminous cover for said receptacle, and a lid hinged to said cover and adapted to engage at its free end with the walls of the manger, substantially as described.

2. In combination with a feed trough, a receptacle adapted to be inserted in said trough at the bottom thereof, a foraminous cover hinged to the open end of said receptacle, and a top hinged at one edge to the free edge of said cover, substantially as described.

3. An attachment for feed troughs comprising a rectangular receptacle open at its upper end and adapted for insertion in a trough at the bottom thereof, a foraminous cover concaved laterally and hinged at one edge to the edges of said open end, a lid hinged to the free edge of said cover and means for holding said lid open, substantially as described.

In testimony whereof, I affix my signature, in the presence of two witnesses.

GEORGE A. LIPSIUS.

Witnesses:
I. W. Clements,
D. H. Green.

Copies of this patent may be obtained for five cents each, by addressing the "Commissioner of Patents, Washington, D. C."